Nov. 21, 1967  G. H. PORATH  3,353,275
CONTOUR INSPECTING MACHINE
Filed July 19, 1965  7 Sheets-Sheet 1

FIG. 1

INVENTOR.
GORDON H. PORATH
BY
ATTORNEYS

Nov. 21, 1967 G. H. PORATH 3,353,275
CONTOUR INSPECTING MACHINE
Filed July 19, 1965 7 Sheets-Sheet 2

INVENTOR.
GORDON H. PORATH
BY
Barnes, Kisselle, Raisch & Choate
ATTORNEYS

INVENTOR.
GORDON H. PORATH
ATTORNEYS

INVENTOR.
GORDON H. PORATH
BY
ATTORNEYS

United States Patent Office 3,353,275
Patented Nov. 21, 1967

3,353,275
CONTOUR INSPECTING MACHINE
Gordon H. Porath, Detroit, Mich., assignor to Century-Detroit Corporation, Detroit, Mich., a corporation of Michigan
Filed July 19, 1965, Ser. No. 472,927
17 Claims. (Cl. 33—174)

ABSTRACT OF THE DISCLOSURE

The contour inspecting machine disclosed herein includes a support for a standard which is to be compared with a workpiece that is supported on a rotary table. A horizontal slide is movable along an accurate horizontal line and a vertical slide is movable along an accurate vertical line. The vertical slide supports a tracer head which is positioned adjacent the standard and causes a tracer control to direct a signal to a horizontal servo control or a vertical servo control, or both, for moving the horizontal slide to cause the tracer head to follow the contour of the standard. A sensing head is provided adjacent the surface of the standard and a similar sensing head is provided adjacent the surface of the workpiece which is to be inspected. As the tracer head causes the horizontal and vertical slides to follow the contour of the standard, the sensing heads in turn follow the contours of the standard and workpiece, respectively. The signals from the sensing heads are then compared to produce a differential signal that is recorded on a recorder. The horizontal slide and vertical slide are supported by hydrostatic bearings.

---

This invention relates to inspecting the contour of workpieces and particularly to inspecting the external, internal or both surfaces of a workpiece along a single plane or path at a time.

It is the object of the invention to provide a contour inspecting machine which can inspect the surfaces of workpieces and compare them to a standard within great accuracies not heretofore possible on the order of ±0.0001″ absolute over large distances, such as 30″–60″, with reproducibility to ±0.000025″.

It is a further object of the invention to provide a contour inspecting machine wherein the manufacturing template can be used to inspect the surfaces of workpieces.

It is a further object of the invention to provide a contour inspecting machine which is operable upon a differential signal principle.

It is a further object of the invention to provide a contour inspecting machine which can be utilized for inspecting both the internal and external contours of workpieces and comparing them with a standard.

It is a further object of the invention to provide a contour inspecting machine where the contours of workpieces are inspected and compared continuously.

It is a further object of the invention to provide a contour inspecting machine wherein the contours of workpieces can be inspected along meridians, parallels, diameters, spirals and other paths at will.

General construction

Figure 1:
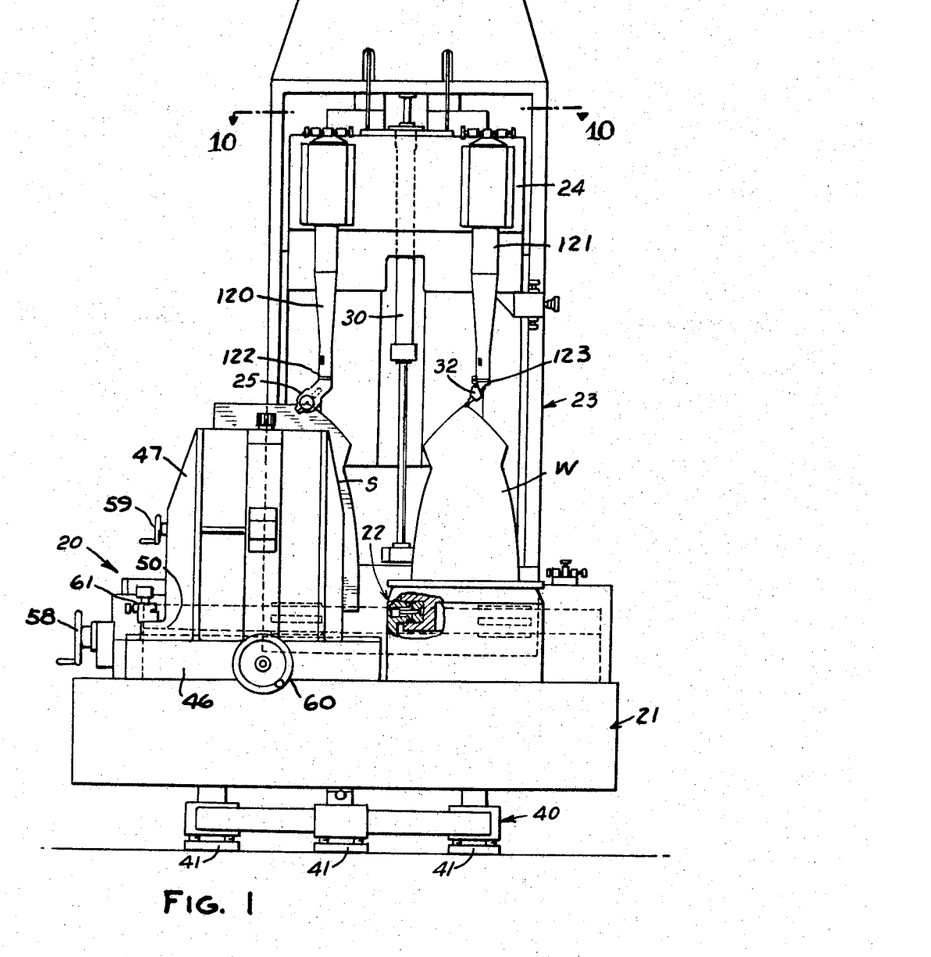
FIG. 1 is a front elevational view of a contour inspecting machine embodying the invention.

The contour inspecting machine embodying the invention is intended to compare the surface contour of a workpiece W with the surface of a standard or template S. As shown in FIG. 1, which is a front elevational view of the machine, and FIG. 9, which is a schematic diagram of the machine, the standard S is supported by standard supporting means 20 on a base 21 while the workpiece W is supported by a rotary table 22 on the base 21. A horizontal slide 23 is movable along an accurate horizontal line on the base 21 and a vertical slide 24 is movable along an accurate vertical line with respect to the horizontal slide 23. The vertical slide 24 supports a tracer head 25, which is positioned adjacent to standard S, and causes a tracer control 26 to direct a signal to a horizontal servo control 27 or a vertical servo control 28, or both, and thereby move the horizontal slide 23 through cylinder 29 or the vertical slide 24 through cylinder 30, or both, to follow the contour of the standard S.

Figure 9:
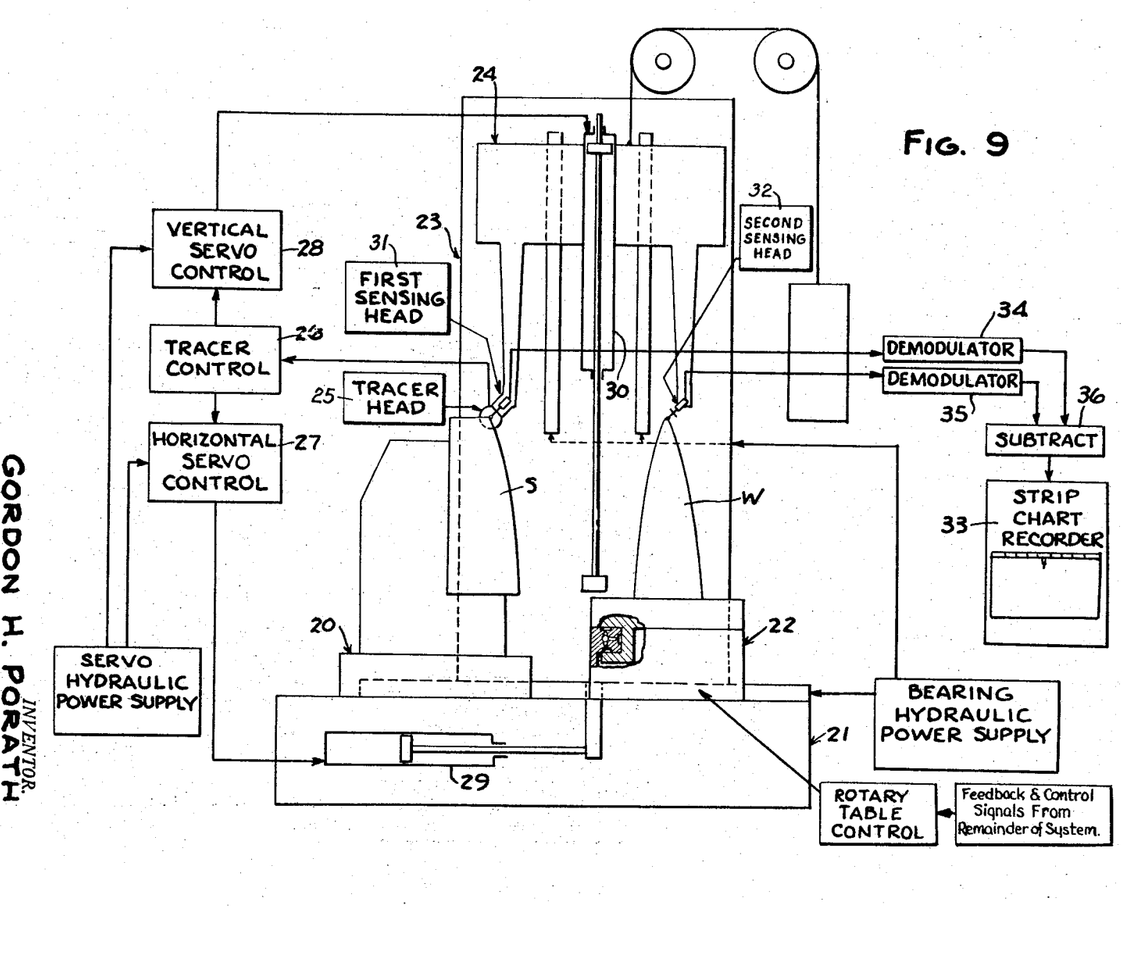
FIG. 9 is a schematic hydraulic and electrical diagram of the apparatus embodying the invention.

A sensing head 31, preferably in the form of a differential transformer, is provided adjacent to the surface of the standard S and a similar sensing head 32 is provided adjacent to the surface of the workpiece W which is to be inspected. As the tracer head 25 causes the horizontal and vertical slides 23, 24 to follow the contour of the standard S, the sensing heads 31, 32 in turn follow the contours of the standard S and the workpiece W, respectively. The signals from each of the sensing heads 31 and 32 are then caused to produce a differential signal that can be recorded on a strip chart recorder 33. Where the sensing heads 31 and 32 comprise differential transformers, the signals first pass through demodulators 34 and 35 to a differential mechanism 36.

Further in accordance with the invention, the horizontal slide 23 is supported on the base 21 and the vertical slide 24 is supported on the horizontal slide 23 by hydrostatic bearings in the form of longitudinally spaced pressure pads on the complementary surfaces. A restrictor, such as an orifice, is associated with each pressure pad and liquid under predetermined pressure is supplied to each orifice. The relative dimensions of the surfaces are such that a pressurized film of liquid flows continuously between the surfaces through the pressure pads so that the forces on the pads are balanced by pressure in the pads providing a permanent separation of the surfaces throughout the movement of the slides. The pads are so positioned that the slides are stabilized laterally in all directions with respect to the lines of movement. In accordance with such a bearing construction, the slides are held in predetermined accurate relationship so that an extremely accurate inspection of the surface of the workpiece W is achieved.

After one contour of the workpiece W is inspected, the rotary table 22 can be rotated to bring another contour in position for inspection. If the next contour to be inspected has a different standard contour, then the template or standard S is replaced and a new standard is positioned in the supporting means 20. It can be appreciated and will be apparent from the more detailed description below that the mounting means 20 can comprise a rotary table which supports a standard workpiece that is indexed as the workpiece W is indexed to bring a new contour into position to serve as a standard for inspection. Further, it will be understood that by programming the rotary table motion and trace sequence, various path types, such as meridians, parallels, spirals and the like, can be traced at will.

The base construction

Figure 2:
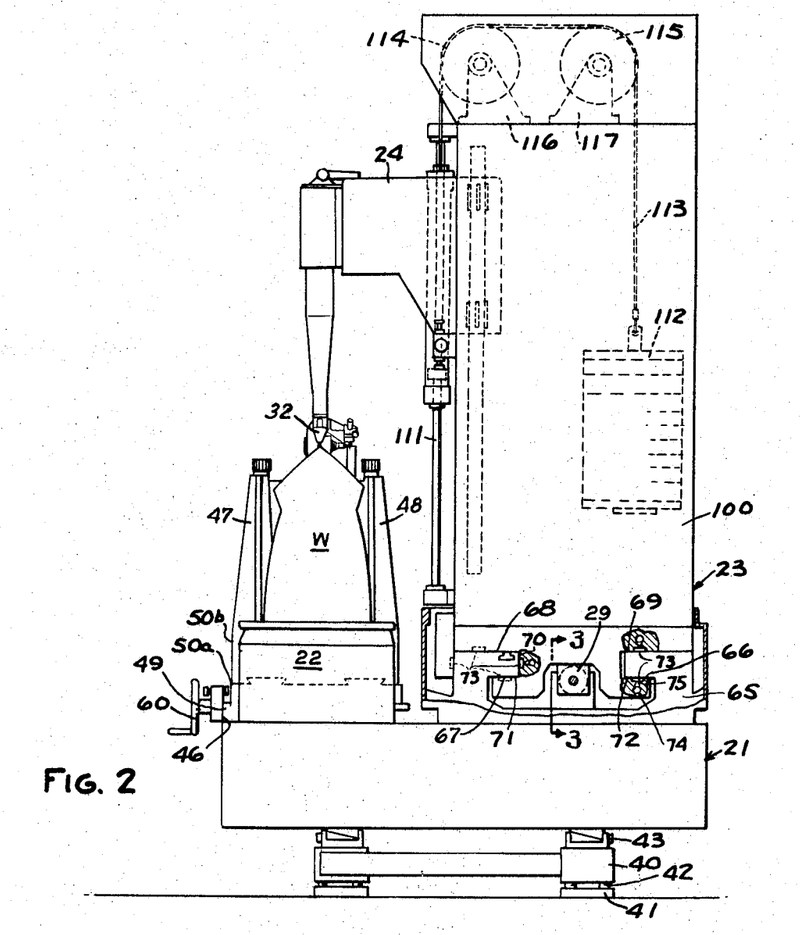
FIG. 2 is a side elevational view of the machine taken from the right side as shown in FIG. 1.

Referring to FIGS. 1 and 2, the base 21 preferably comprises a block of natural stone such as black granite or a cast material of great dimensional stability such as Meechanite cast iron which has the top surface thereof finished accurately within close tolerances on the order of 0.0002". The block 21, if granite, is supported on the floor by a frame 40 which comprises a plurality of interconnected pads. The frame 40 has feet 11 which are adjustable vertically for sharing the load by screws 42. The base 21 can be further leveled with respect to the frame by wedge type leveling jacks 43. If the base 21 is cast, the wedge feet carry the primary load and the screws 42 are attached to the base rather than to a separate frame. Thus the base provides an accurate flat surface.

Supporting means for standard template

The supporting means 20 for the standard template comprises a base plate 46 which rests on the flat horizontal upper surface of the base 21. A first slide 50a is mounted on base plate 46 by means of a keyway 49. A screw and nut connection, not shown, is manipulated by hand wheel 60 to move the slide 50a inwardly and outwardly as shown in FIG. 1. A second slide 50b is mounted on the first slide 50a by tongue and groove connections for movement at right angles to the direction of the first slide 50a. A screw and nut mechanism, not shown, is operated by rotation of a hand wheel 58 to translate the upper slide 50b relative to the lower slide 50a.

Opposed vertical frames 47, 48 are provided on the upper slide 50b.

Figure 14:
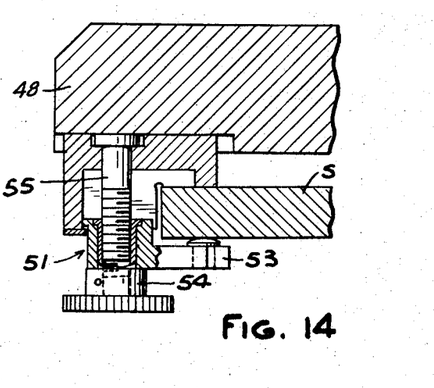
FIG. 14 is a fragmentary sectional view on an enlarged scale taken along the line 14—14 in FIG. 12.
Figure 15:
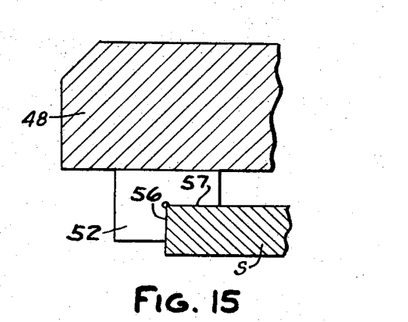
FIG. 15 is a fragmentary sectional view on an enlarged scale taken along the line 15—15 in FIG. 12.

As shown in FIGS. 12–15, each of the upright frames 47 and 48 is provided with adjustable stops 51 and fixed stops 52 that permit proper alignment of the template or standard on the frame. As shown in FIG. 14, each adjustable stop 51 includes a clamp 53 that is locked into position by rotation of a knob 54 that threads onto a screw 55 to clamp the standard plate S into position. As shown in FIG. 15, each fixed stop 52 includes right angle surfaces 56, 57 against which the end of the plate extends. As is apparent from the drawings, as viewed from the front of the machine as shown in FIG. 1, the rear frame 48 is adapted to support the standard that has an external contour for gauging and the front frame 47 has the stops 51, 52 thereon oppositely disposed to support a standard with an internal contour. Clamps 61 are provided at appropriate positions for clamping the slides 50a, 50b after they have been adjusted so that the position of the standards will not change.

Workpiece supporting table

As shown in FIGS. 1 and 2, the rotary table 22 for supporting the workpiece W in inspection position rests on the accurately formed top surface of the block 21. The rotary table can be of conventional construction or preferably can utilize hydrostatic bearings provided that it has the highest possible accuracy. As shown, the rotary table is provided with hydrostatic bearings and has a construction such as disclosed and claimed in my Patent No. 3,193,334. When the table is placed in position on the block 21, it is leveled so that the top surface of the table is in accurate parallel relationship to the top surface of the block 21.

The position of the table 22 horizontally on the block 21 is such that when the workpiece W is on the table, the contour defined by the standard S corresponds to the contour of the workpiece W that is in position to be inspected.

Horizontal and vertical slide assemblies

As shown in FIG. 2, the horizontal slide assembly 23 includes a base section 65 that rests on the top surface of the block 21.

As shown in FIG. 2, base section 65 is provided with re-entrant slots 66, 67 and the bottom on the horizontal slide assembly 23 is formed with complementary surfaces 68, 69, 70, 71 and 72. The surfaces 68, 69, 70, 71, 72 are each provided with pressure recesses or pads 73 at longitudinally spaced points thereon. A passage 74 extends to each pad and an orifice 75 is associated with each pad so that hydraulic fluid under pressure can be supplied at predetermined pressure to each pad. The complementary surfaces are so dimensioned that when hydraulic liquid under pressure passes through the pads, a continuous film of liquid flows from the pads between the complementary surfaces to the extremities of the surfaces which in turn form drain areas. By this arrangement, the horizontal slide assembly 23 is supported in accurate stable relation to the base section 65 so that there is no friction between the horizontal slide assembly and the base section and the horizontal slide assembly moves along the base section with a minimum of force.

Figure 10:
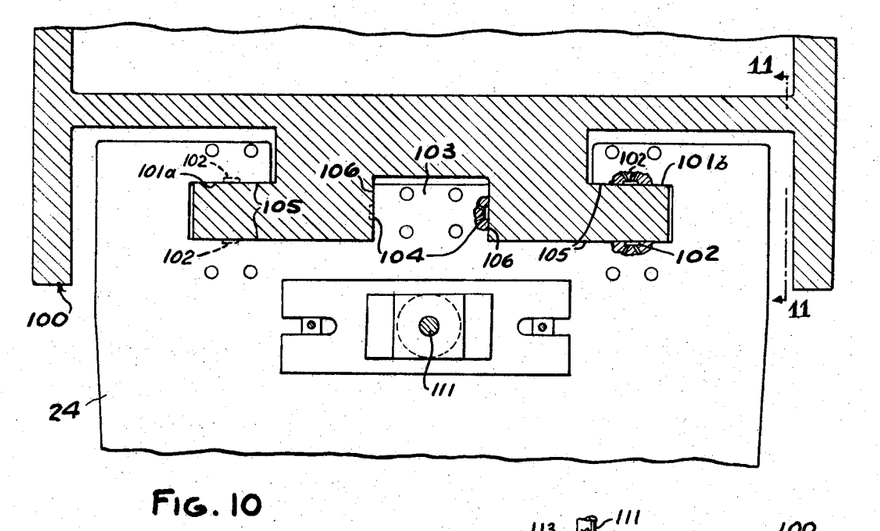
FIG. 10 is a fragmentary sectional view on an enlarged scale taken along the line 10—10 in FIG. 1.
Figure 11:
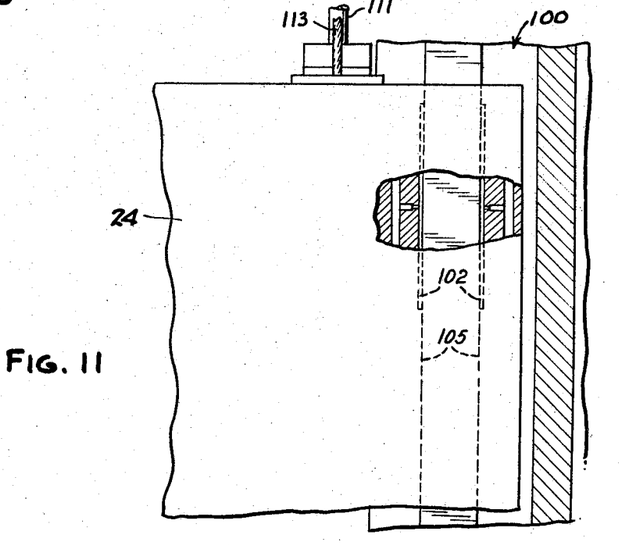
FIG. 11 is a fragmentary sectional view taken along the line 11—11 in FIG. 10.
Figure 12:
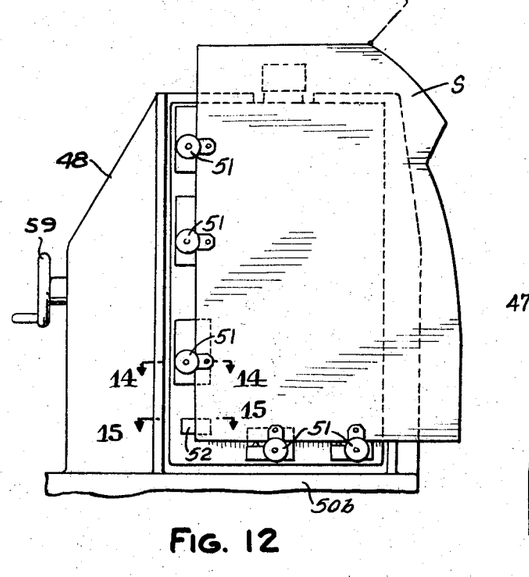
FIG. 12 is a fragmentary vertical sectional view through a portion of the apparatus shown in FIG. 1 and FIG. 2.
Figure 13:
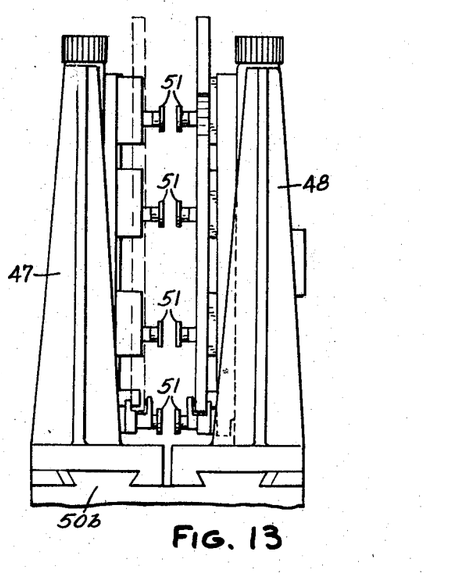
FIG. 13 is an end view of the apparatus shown in FIG. 12.

A similar arrangement is provided for the vertical slide 24 as shown in FIGS. 10 and 11. As shown in FIG. 10, the horizontal slide includes an upright frame 100. The vertical slide 24 includes rectangular re-entrant slots 101a, 101b which have opposed pressure recesses or pads 102 therein and a central rectangular projection 103 having pressure pads 104 oppositely disposed thereon. The frame 100 includes complementary projecting portions having surfaces 105, 106 opposite the pads 102, 104, respectively, and the surfaces are so dimensioned as described in connection with the horizontal slide that a continuous film of liquid flows from the pads between the complementary surfaces to the drain areas and the vertical slide is thereby supported in accurate stable relationship with respect to the frame 100 of the horizontal slide.

Figure 3:
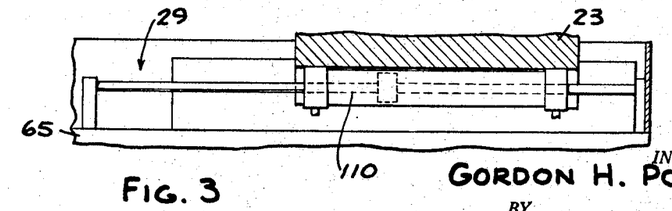
FIG. 3 is a fragmentary sectional view taken along the line 3—3 in FIG. 2.
Figure 4:
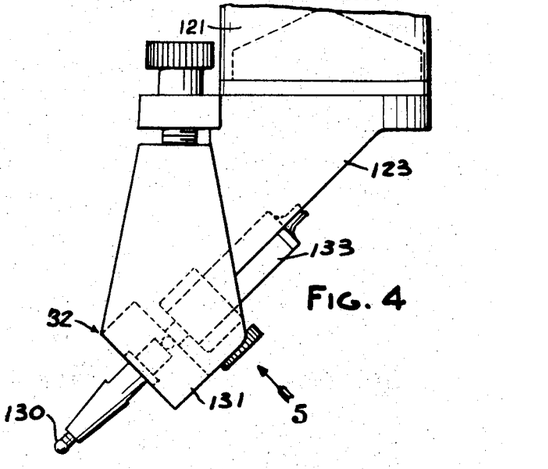
FIG. 4 is a fragmentary view on an enlarged scale of a portion of the apparatus shown in FIG. 1.
Figure 5:
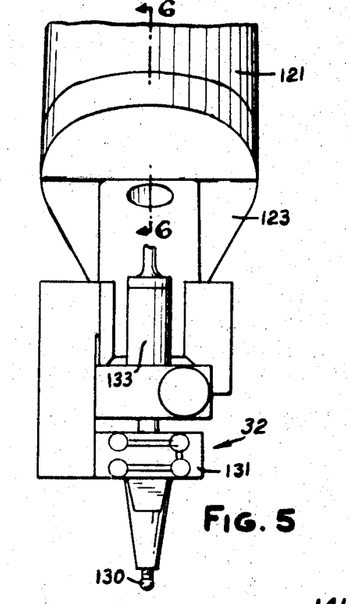
FIG. 5 is a fragmentary view taken in the direction of the arrow 5 in FIG. 4.

As shown in FIG. 3, the piston rod 110 of cylinder 29 is connected to the horizontal slide 23 and the cylinder 29 is in turn fixed on the base section 65. Similarly, the cylinder 30 is fixed on the vertical slide 24 and the piston rod 111 thereof extend in both directions to the base of the frame 100 on the vertical slide 23. The weight of the vertical slide 24 and the mechanism thereon is preferably counterweighed by a weight 112 connected to the vertical slide 24 by a cable 113 and trained over pulleys 114, 115 journalled by brackets 116, 117 in the upper part of the frame 100.

Tracer and sensing head construction

As shown in FIGS. 1 and 2, probe arms 120, 121 project downwardly from the vertical slide 24 adjacent to the standard S and workpiece W, respectively. A head 122 on the probe arm 120 supports the tracer head 25 and the first sensing gage head 31. In a similar manner, a head 123 on the probe arm 121 supports the second sensing gage head 32 adjacent to the workpiece W.

Figure 7:
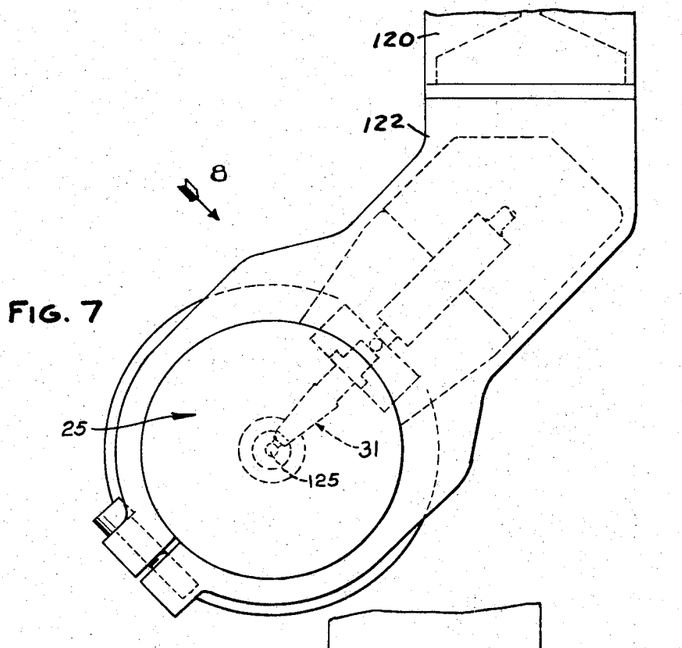
FIG. 7 is a fragmentary front elevational view on an enlarged scale of a portion of the apparatus shown in FIG. 1.
Figure 8:
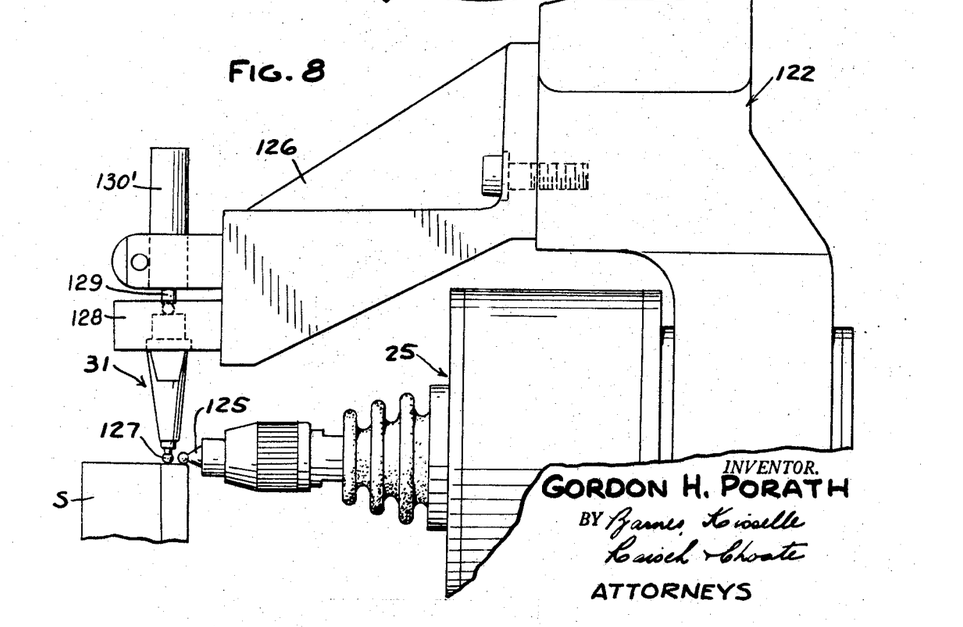
FIG. 8 is a fragmentary view taken in the direction of the arrow 8 in FIG. 7.

As shown in FIGS. 7 and 8, the head 122 is movably mounted on the lower end of the probe arm 120, as presently described, and supports tracer head 25 which (in one embodiment) has a tracer finger 125 that projects from the head 122 in a direction at a right angle to the plane of the standard S which is to be followed. The tracer head 25 can be of any conventional construction and the tracer control associated therewith is of corresponding construction. Satisfactory results have been achieved by utilizing an electro-hydraulic tracing system manufactured by Honeywell Company, Minneapolis, Minn., under the designations W303E1021 360° tracer control system electric panel, W329A1004 400 cycle power supply, V7037D1007 four way servo valve and 150075A manifolds for V7037 model servo valves, 360° tracer head #120408C, tracer head excitation panel #120832A.

The head 122 also supports the first sensing gage head 31 in position adjacent the surface of the template or standard S by means of a bracket 126. The sensing head 31 includes a sensing finger 127 that may be supported by a reed assembly 128 to suppress unwanted components of motion and is adapted to move the armature 129 of a differential transformer 130′ and thereby produce a signal corresponding to the position of the sensing finger 127.

Similarly, the head 123 on the lower end of the probe arm 121 supports the second sensing head 32 which is of similar construction to head 31 and includes a sensing finger 130 that may be supported by a reed assembly 131 and is adapted to move the armature 132 of a differential transformer 133.

Figure 6:
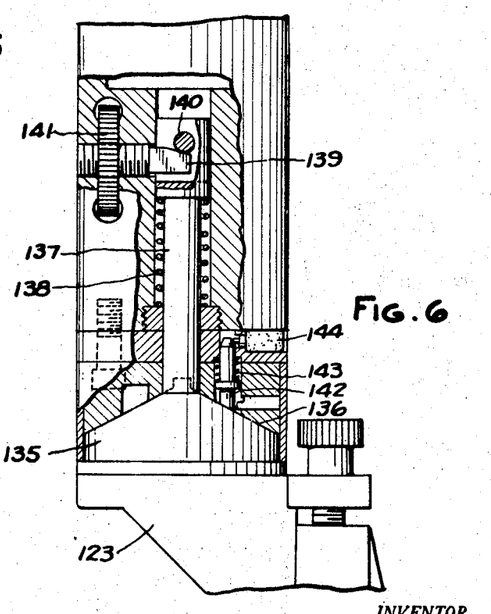
FIG. 6 is a fragmentary sectional view of the portion of the apparatus shown in FIG. 5 taken along the line 6—6 in a different operative position.

As shown in FIG. 6, the head 123 has a wedge 135 on the upper end thereof that seats in a complementary wedge shaped surface 136 on the supporting arm. By rotating the head 123, the sensing finger 130 can be shifted 180 degrees.

As shown in FIG. 6, a rod 137 is fixed to the upper end of the wedge 135 and a spring 138 yieldingly urges the head 123 upwardly to bring the wedge 135 into contact with the complementary surfaces 136. A pin 139 having a beveled surface is adapted to engage a cross pin 140 on the rod 137 to lock the head into position. The pin 139 is threaded and passes through a journalled knob 141. When the knob 141 is rotated, the pin 139 is retracted permitting the head 123 to be pulled downwardly against the action of the spring 138 and thereby shift the position of the head and, in turn, the sensing finger 130. A pin 142 on one of the surfaces of the wedge 135 is adapted to actuate a plunger 143 that operates a microswitch 144 to produce a sensing signal indicating that the sensing finger is in one of its two positions.

*Operation*

In use, the workpiece W which is to be inspected is placed on rotary table 22 and the standard template, which may be the manufacturing template, is mounted on the supporting means 20. The vertical and horizontal slides are then operated intermittently to bring the tracer head 25 into position adjacent the standard template. The machine is thereafter placed on automatic control and the tracer head 25 follows the contour of the template while the sensing heads 31, 32 follow the surfaces of the template and the workpiece W, respectively.

Where the workpiece has a continuous surface of revolution, the same template can be used for checking along successive meridians by indexing the rotary table. Alternatively, a parallel or diameter can be inspected by continuously rotating the rotary table. Where only a general inspection is desired, the rotary table can be operated continuously while the tracer head 25 moves along the template S thereby inspecting along a spiral. The manner in which the movement of the rotary table is interconnected to the other movements of the system is shown diagrammatically in FIG. 9.

I claim:

1. In a machine for inspecting the contour of a workpiece, the combination comprising
   a base,
   means for supporting a standard on said base with a standard contour lying in a generally vertical plane relative to said base,
   means for supporting a workpiece on said base with the contour of the workpiece to be inspected lying in a plane parallel to the standard contour of the standard,
   a horizontal slide assembly on said base,
   said horizontal slide assembly comprising a base portion,
   a slide adapted to move horizontally on said base portion,
   one of said slide and said base portions having surfaces formed with longitudinally spaced pressure pads,
   a restrictor associated with each pressure pad,
   means for supplying liquid under pressure to each said restrictor,
   the other of said slide and said base portion having complementary cooperating surfaces adjacent to the surfaces on which said pressure pads are positioned,
   the relative dimensions of said base portion and said slide being such that a pressurized film of liquid flows continuously between the surfaces through the pressure pads so that forces on the slide are balanced by pressure in the pads providing a permanent, stable, frictionless separation of the surface throughout the movement of the horizontal slide longitudinally on the base portion,
   a vertical slide assembly on said horizontal slide,
   said vertical slide assembly including a vertical slide adapted to be moved vertically along said horizontal slide,
   said vertical slide having surfaces each formed with longitudinally spaced pressure pads,
   a restrictor associated with each pressure pad,
   means for supplying liquid under pressure to each said restrictor on said vertical slide,
   said horizontal slide including complementary cooperating surfaces adjacent to surfaces on which said pressure pads of said vertical slide are positioned,
   the relative dimensions of said surfaces on said vertical and horizontal slides being such that a pressurized film of liquid flows continuously between the surfaces through the pressure pads so that forces on the vertical slide are balanced by pressure in the pads providing a permanent, stable, frictionless separation of the surfaces throughout the movement of the vertical slide on the horizontal slide,
   a first head assembly mounted on said vertical slide adjacent to the standard supporting means,
   a tracing head mounted on said first head assembly,
   means operatively connected to said tracing head for moving said vertical and horizontal slides in response to signals from said tracing head,
   a first sensing head mounted on said first head assembly for producing a signal corresponding to the position of said sensing head,
   a second head assembly mounted on said vertical slide adjacent to the workpiece supporting means,
   a second sensing head mounted on said second head assembly for contacting the surface of the workpiece which is to be inspected and producing a signal in response thereto,
   and means for producing a differential signal between the readings of said first and second sensing heads to produce an accurate signal corresponding to the deviation of said surface of the workpiece with respect to the standard surface.

2. The combination set forth in claim 1 wherein said tracing head includes a tracing finger which has its axis extending generally horizontally and at right angles to the plane of the standard surface which is supported by said standard supporting means.

3. The combination set forth in claim 1 wherein each said sensing head has a sensing finger extending downwardly at an angle of approximately 45° to the vertical.

4. The combination set forth in claim 1 wherein each said head assembly is movable 180° so that the direction of the sensing and tracing heads can be changed relative to the standard and the workpiece for changing between an inspecting position for internal and external surfaces.

5. The combination set forth in claim 1 wherein each said sensing head includes a differential transformer and a sensing finger associated therewith.

6. The combination set forth in claim 5 wherein each said head assembly includes means for mounting said sensing finger for axial movement.

7. The combination set forth in claim 1 including counterweight means for counterbalancing said vertical slide relative to said horizontal slide.

8. The combination set forth in claim 1 wherein said base has an accurately formed horizontal surface on which each said standard mounting means and said base portion of said horizontal slide assembly are mounted.

9. The combination set forth in claim 8 including means for supporting and leveling said base.

10. The combination set forth in claim 1 wherein said standard supporting means includes a pair of opposed mechanism utilizable selectively to support standards having internal and external surface contours, respectively.

11. The combination set forth in claim 1 including hydraulic cylinder means for moving said horizontal slide and hydraulic cylinder means for moving said vertical slide.

12. In a machine for inspection the contour of a workpiece, the combination comprising
a base,
means for supporting a standard on said base with a standard contour lying in a generally vertical plane relative to said base,
means for supporting a workpiece on said base with the contour of the workpiece to be inspected lying on a plane parallel to the standard contour of the standard,
a horizontal slide assembly on said base,
said horizontal slide assembly comprising a base portion,
a slide adapted to move horizontally on said base portion,
one of said slide and said base portion having surfaces formed with longitudinally spaced pressure pads,
a restrictor associated with each pressure pad,
means for supplying liquid under pressure to each said restrictor,
the other of said slide and said base portion having complementary cooperating surfaces adjacent to the surfaces on which said pressure pads are positioned,
the relative dimensions of said base portion and said slide being such that pressurized film of liquid flows continuously between the surfaces through the pressure pads so that forces on the slide are balanced by pressure in the pads providing a permanent, stable, frictionless separation of the surfaces throughout the movement of the horizontal slide longitudinally on the base portion,
a vertical slide assembly on said horizontal slide,
said vertical slide assembly including a vertical slide adapted to be moved vertically along said horizontal slide,
said vertical slide having surfaces each formed with longitudinally spaced pressure pads,
a restrictor associated with each pressure pad,
means for supplying liquid under pressure to each said restrictor on said vertical slide,
said horizontal slide including complementary cooperating surfaces adjacent to surfaces on which said pressure pads of said vertical slide are positioned,
the relative dimensions of said surfaces on said vertical and horizontal slides being such that a pressurized film of liquid flows continuously between the surfaces through the pressure pads so that forces on the vertical slide are balanced by pressure in the pads providing a permanent, stable, frictionless separation of the surfaces throughout the movement of the vertical slide on the horizontal slide,
a first head assembly mounted on said vertical slide adjacent said standard supporting means,
a tracing head mounted on said first head assembly,
a tracer control operable by said tracer head,
horizontal servo control means for moving said horizontal slide in response to said tracer control,
vertical servo control means for moving said vertical slide in response to said tracer control,
a first sensing head mounted on said first head assembly for producing a signal corresponding to the position of said sensing head,
a second head assembly mounted on said vertical slide adjacent to the workpiece supporting means,
a second sensing head mounted on said head assembly for contacting the surface of the workpiece which is to be inspected and producing a signal in response thereto,
and means for producing a differential signal between the readings of said first and second sensing heads to produce an accurate signal corresponding to the deviation of said surface of the workpiece with respect to the standard surface,
and recording means for recording said differential signal.

13. In a machine for inspecting the contour of a workpiece, the combination comprising
a base,
means for supporting a standard on said base with a standard contour lying in a generally vertical plane relative to said base,
a rotary table for supporting a workpiece on said base with the contour of the workpiece to be inspected lying in a plane parallel to the standard contour of the standard,
a horizontal slide assembly on said base,
said horizontal slide assembly comprising a base portion,
a slide adapted to move horizontally on said base portion,
one of said slide and said base portions having surfaces formed with longitudinally spaced pressure pads,
a restrictor associated with each pressure pad,
means for supplying liquid under pressure to each said restrictor,
the other of said slide and said base portion having complementary cooperating surfaces adjacent to the surfaces on which said pressure pads are positioned,
the relative dimensions of said base portion and said slide being such that a pressurized film of liquid flows continuously between the surfaces through the pressure pads so that forces on the slide are balanced by pressure in the pads providing a permanent, stable, frictionless separation of the surfaces throughout the movement of the horizontal slide longitudinally on the base portion,
a vertical slide assembly on said horizontal slide,
said vertical slide assembly including a vertical slide adapted to be moved vertically along said horizontal slide,
said vertical slide having surfaces each formed with longitudinally spaced pressure pads,
a restrictor associated with each pressure pad,
means for supplying liquid under pressure to each said restrictor on said vertical slide,
said horizontal slide including complementary cooperation surfaces adjacent to surfaces on which said pressure pads of said vertical slide are positioned,
the relative dimensions of said surfaces on said vertical and horizontal slides being such that a pressurized film of liquid flows continuously between the surfaces through the pressure pads so that forces on the vertical slide are balanced by pressure in the pads providing a permanent, stable, frictionless separation of the surfaces throughout the movement of the vertical slide on the horizontal slide, a first head assembly mounted on said vertical slide adjacent to the standard supporting means, a tracing head mounted on said first head assembly, means operatively connected to said tracing head for moving said vertical and horizontal slides in response to signals from said tracing head, a first sensing head mounted on said first head assembly for producing a signal corresponding to the position of said sensing head, a second head assembly mounted on said vertical slide adjacent to the workpiece supporting means, a second sensing head mounted on said second head assembly for contacting the surface of the workpiece which is to be inspected and producing a signal in response thereto, and means for producing a differential signal between the readings of said first and second sensing heads to produce an accurate signal corresponding to the deviation of said surface of the workpiece with respect to the standard surface.

14. The combination set forth in claim 13 including means for rotating said table in coordinated sequence with said tracing head.

15. The combination set forth in claim 14 wherein said rotary table incorporates hydrostatic bearings.

16. In a machine for inspecting the contour of a workpiece, the combination comprising a base, means for supporting a standard on said base with a standard contour lying in a generally vertical plane relative to said base, means for supporting a workpiece on said base with the contour of the workpiece to be inspected lying in a plane parallel to the standard contour of the standard, said standard comprising the working template from which said contour of said workpiece was formed, a horizontal slide assembly on said base, said horizontal slide assembly comprising a base portion, a slide adapted to move horizontally on said base portion, one of said slide and said base portions having surfaces formed with longitudinally spaced pressure pads, a restrictor associated with each pressure pad, means for supplying liquid under pressure to each said restrictor, the other of said slide and said base portion having complementary cooperating surfaces adjacent to the surfaces on which said pressure pads are positioned, the relative dimensions of said base portion and said slide being such that a pressurized film of liquid flows continuously between the surfaces through the pressure pads so that forces on the slide are balanced by pressure in the pads providing a permanent, stable, frictionless separation of the surfaces throughout the movement of the horizontal slide longitudinally on the base portion, a vertical slide assembly on said horizontal slide, said vertical slide assembly including a vertical slide adapted to be moved vertically along said horizontal slide, said vertical slide having surfaces each formed with longitudinally spaced pressure pads, a restrictor associated with each pressure pad, means for supplying liquid under pressure to each said restrictor on said vertical slide, said horizontal slide including complementary cooperation surfaces adjacent to surfaces on which said pressure pads of said vertical slide are positioned, the relative dimensions of said surfaces on said vertical and horizontal slides being such that a pressurized film of liquid flows continuously between the surfaces through the pressure pads so that forces on the vertical slide are balanced by pressure in the pads providing a permanent, stable, frictionless separation of the surfaces throughout the movement of the vertical slide on the horizontal slide, a first head assembly mounted on said vertical slide adjacent to the standard supporting means, a tracing head mounted on said first head assembly, means operatively connected to said tracing head for moving said vertical and horizontal slides in response to signals from said tracing head, a first sensing head mounted on said first head assembly for producing a signal corresponding to the position of said sensing head, a second head assembly mounted on said vertical slide adjacent to the workpiece supporting means, a second sensing head mounted on said second head assembly for contacting the surface of the workpiece which is to be inspected and producing a signal in response thereto, and means for producing a differential signal between the readings of said first and second sensing heads to produce an accurate signal corresponding to the deviation of said surface of the workpiece with respect to the standard surface.

17. In a machine for inspecting the contour of a workpiece, the combination comprising a base, means for supporting a standard on said base with a standard contour lying in a generally vertical plane relative to said base, means for supporting a workpiece on said base with the contour of the workpiece to be inspected lying on a plane parallel to the standard contour of the standard, a horizontal slide assembly on said base, said horizontal slide assembly comprising a base portion, a slide adapted to move horizontally on said base portion, a vertical slide assembly on said horizontal slide, said vertical slide assembly including a vertical slide adapted to be moved vertically along said horizontal slide, a first head assembly mounted on said vertical slide adjacent said standard supporting means, a tracing head mounted on said first head assembly, a tracer control operable by said tracer head, horizontal servo control means for moving said horizontal slide in response to said tracer control, vertical servo control means for moving said vertical slide in response to said tracer control, a first sensing head mounted on said first head assembly for producing a signal corresponding to the position of said sensing head, a second head assembly mounted on said vertical slide adjacent to the workpiece supporting means, a second sensing head mounted on said head assembly for contacting the surface of the workpiece which is to be inspected and producing a signal in response thereto, and means for producing a differential signal between the readings of said first and second sensing heads to produce an accurate signal corresponding to the deviation of said surface of the workpiece with respect to the standard surface, and recording means for recording said differential signal.

No references cited.

SAMUEL S. MATTHEWS, *Primary Examiner.*

UNITED STATES PATENT OFFICE
CERTIFICATE OF CORRECTION

Patent No. 3,353,275                      November 21, 1967

Gordon H. Porath

It is hereby certified that error appears in the above numbered patent requiring correction and that the said Letters Patent should read as corrected below.

In the heading to the printed specification, lines 3 to 5, for "assignor to Century-Detroit Corporation, Detroit, Mich., a corporation of Michigan" read -- assignor, by mesne assignments, to The Babcock & Wilcox Company, New York, N. Y., a corporation of New Jersey --.

Signed and sealed this 17th day of December 1968.

(SEAL)
Attest:

Edward M. Fletcher, Jr.

Attesting Officer

EDWARD J. BRENNER

Commissioner of Patents